United States Patent [19]

Doi et al.

[11] Patent Number: 5,016,815
[45] Date of Patent: May 21, 1991

[54] AIR CONDITIONER CONTROL SYSTEM FOR VEHICLES

[75] Inventors: Shigetoshi Doi; Yoshiaki Nagayama, both of Hiroshima, Japan

[73] Assignee: Mazda Motor Corporation, Hiroshima, Japan

[21] Appl. No.: 427,485

[22] Filed: Oct. 27, 1989

[30] Foreign Application Priority Data

Oct. 28, 1988 [JP] Japan ............................. 63-270849

[51] Int. Cl.⁵ ........................................... B60H 1/04
[52] U.S. Cl. ............................... 236/49.3; 98/2.01; 98/2.08; 165/17; 165/42; 236/91 C; 237/12.3 A
[58] Field of Search .................... 98/2.08, 2.01; 237/12.3 A, 12.3 B; 236/91 C, 91 E, 49.3; 165/42, 43, 17

[56] References Cited

U.S. PATENT DOCUMENTS

| 4,291,749 | 9/1981 | Ootsuka et al. | 236/49.3 X |
| 4,434,932 | 3/1984 | Hara et al. | 98/2.01 X |
| 4,537,245 | 8/1985 | Nishimura et al. | 236/49.3 X |
| 4,660,461 | 4/1987 | Ohashi et al. | 98/2.01 |
| 4,681,153 | 7/1987 | Uchida | 237/12,3 B X |
| 4,690,203 | 9/1987 | Iida | 237/12.3 B X |
| 4,760,772 | 8/1988 | Horiguchi et al. | 98/2.01 |
| 4,791,981 | 12/1988 | Ito | 237/12.3 B X |
| 4,819,715 | 4/1989 | Kobayashi | 237/12.3 B X |
| 4,858,158 | 8/1989 | Yamaguchi et al. | 237/12.3 A X |
| 4,890,460 | 1/1990 | Takasi et al. | 165/43 X |

FOREIGN PATENT DOCUMENTS

| 30610 | 2/1982 | Japan | 236/49.3 |
| 45210 | 3/1984 | Japan | 236/91 C |
| 120084 | 4/1989 | Japan | |

Primary Examiner—William E. Tapolcai
Attorney, Agent, or Firm—Sixbey, Friedman, Leedom & Ferguson

[57] ABSTRACT

A control system for an air conditioner for a vehicle effects the switching between a heat mode and a heat/-defrost mode on the basis of the ambient temperature and the amount of solar radiation present.

3 Claims, 5 Drawing Sheets

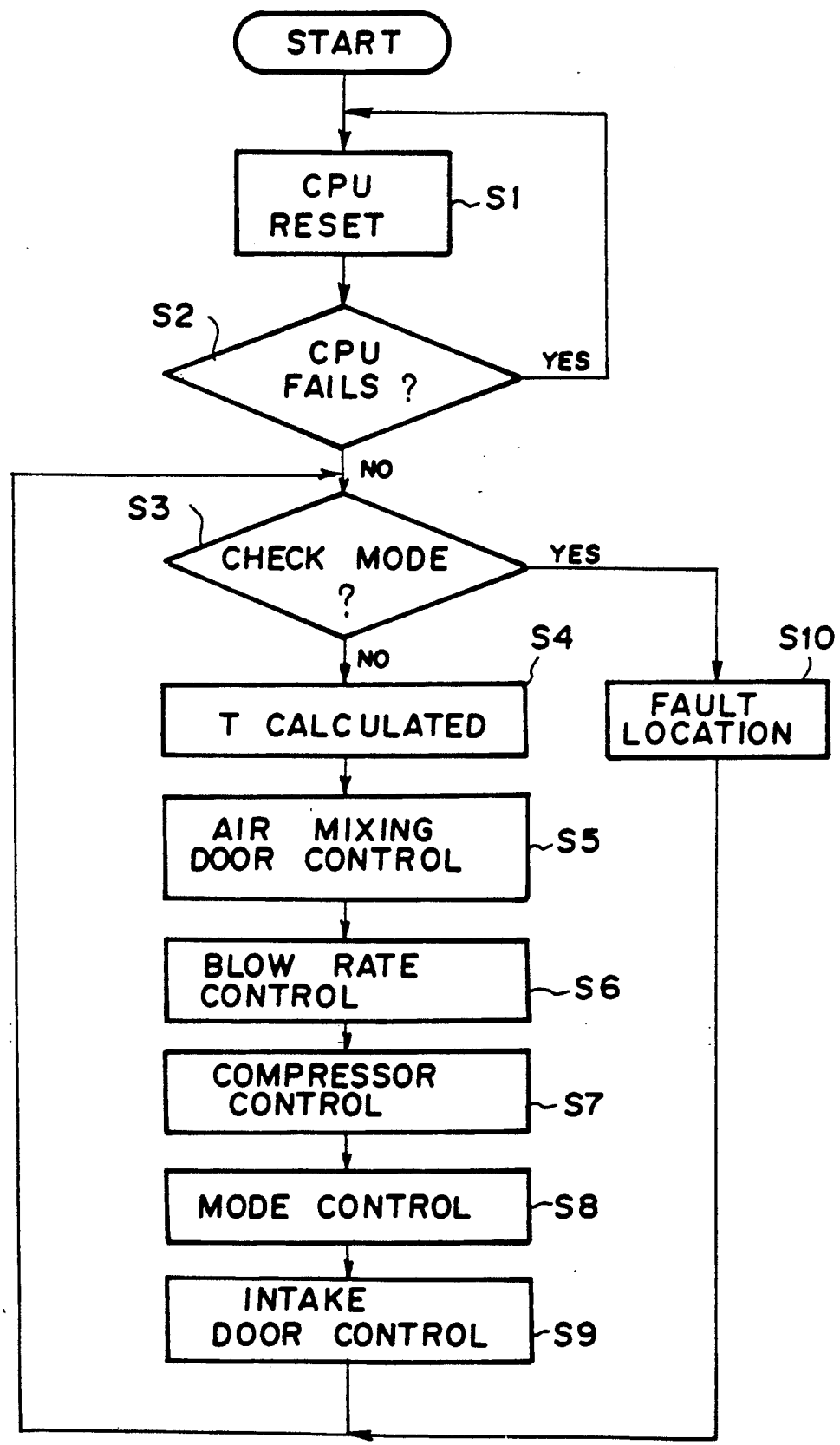

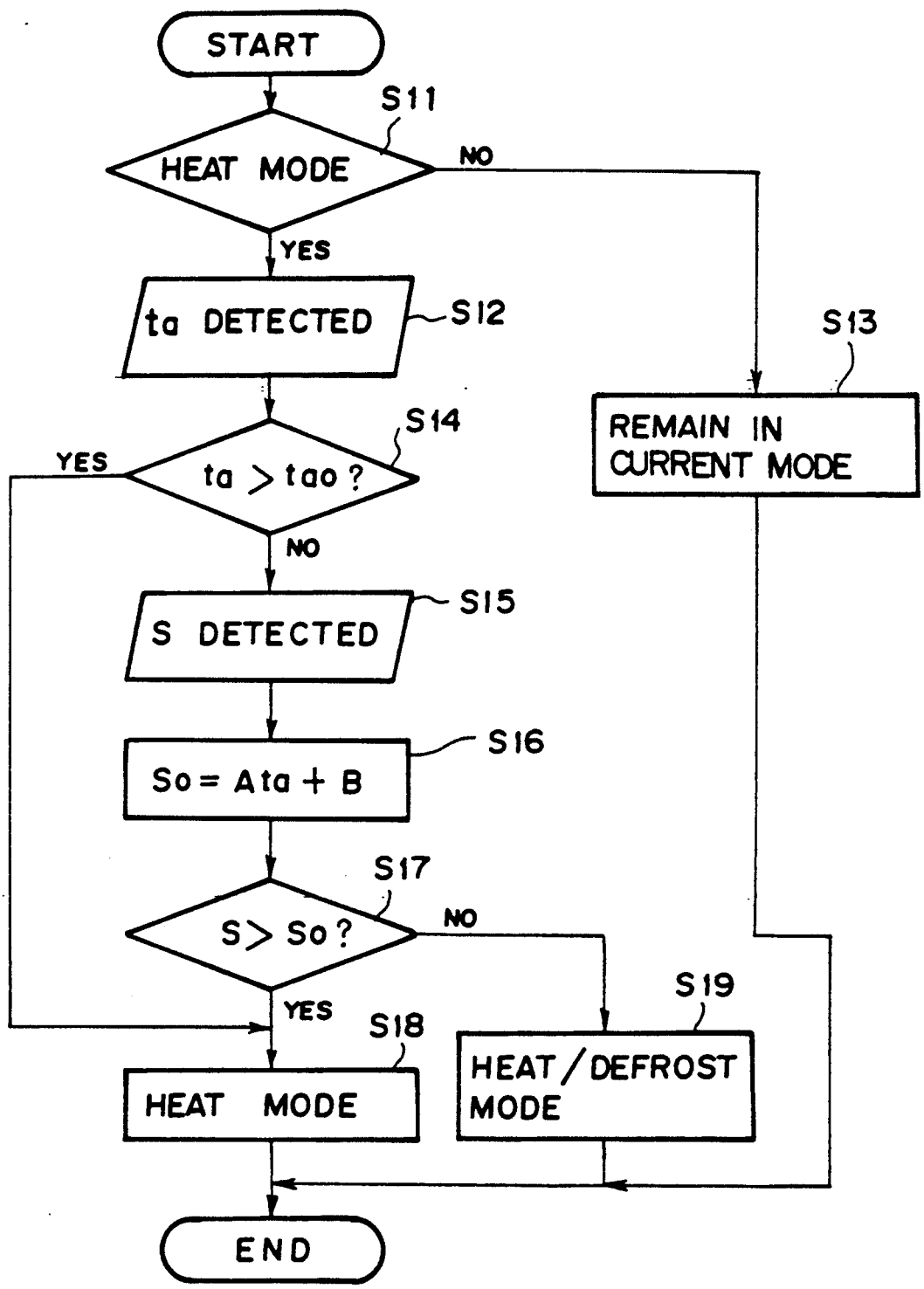

AIR CONDITIONER CONTROL SYSTEM FOR VEHICLES

BACKGROUND OF THE INVENTION

1. Field of the Invention

This invention relates to an air conditioner control system for a vehicle.

2. Description of the Prior Art

Conventional vehicle air conditioners generally operate in a vent mode, a bi-level mode, a heat mode, a heat/defrost mode or a defrost mode. In some vehicle air conditioners, the operational modes automatically change according to the conditions inside or outside the vehicle.

In the air conditioner disclosed in Japanese Unexamined Patent Publication No. 62(1987)-299422 (where the engine coolant is employed as the heat source), the air blow rate is gradually increased (taking into account that the temperature of the coolant is still low) to the rate at which air is blown during the automatic control, and at the same time, the operational mode of the air conditioner is successively switched between the defrost mode, the defrost/heat mode and the heat mode as the coolant temperature increases, thereby improving the defrosting effect and the leg warming effect of the air condition.

In the case of an air conditioner in which the operational mode is switched as the coolant temperature increases, it is preferable for the operational mode to be set to the heat/defrost mode when it is severely cold and the windowpane is apt to frost up. However, when there is insolation, even if the ambient temperature is extremely low the driver's head will get hot due to the hot air being discharged from the defroster vents. That is, because the altitude of the sun is low in winter, especially in northern countries, sunshine will impinge directly upon the driver's head through the windshield and heat it together with the hot air being discharged from the defroster vents.

SUMMARY OF THE INVENTION

In view of the foregoing observations and description, the primary object of the present invention is to provide an air conditioner control system for a vehicle which can prevent the windowpane from frosting over when it is severely cold and at the same time can prevent the driver's head from getting hot when it is severely cold and there is insolation.

The air conditioner control system in accordance with the present invention is characterized in that switching between the heat mode and the heat/defrost mode is a function of the ambient temperature and the amount of solar radiation.

BRIEF DESCRIPTION OF THE DRAWINGS

FIG. 3 is a flow chart for illustrating the main flow of the control routine which the control unit performs, FIG. 5 is a flow chart for illustrating the operation of the control unit when it controls the operational mode of the air conditioner.

DESCRIPTION OF THE PREFERRED EMBODIMENT

Figure 1:
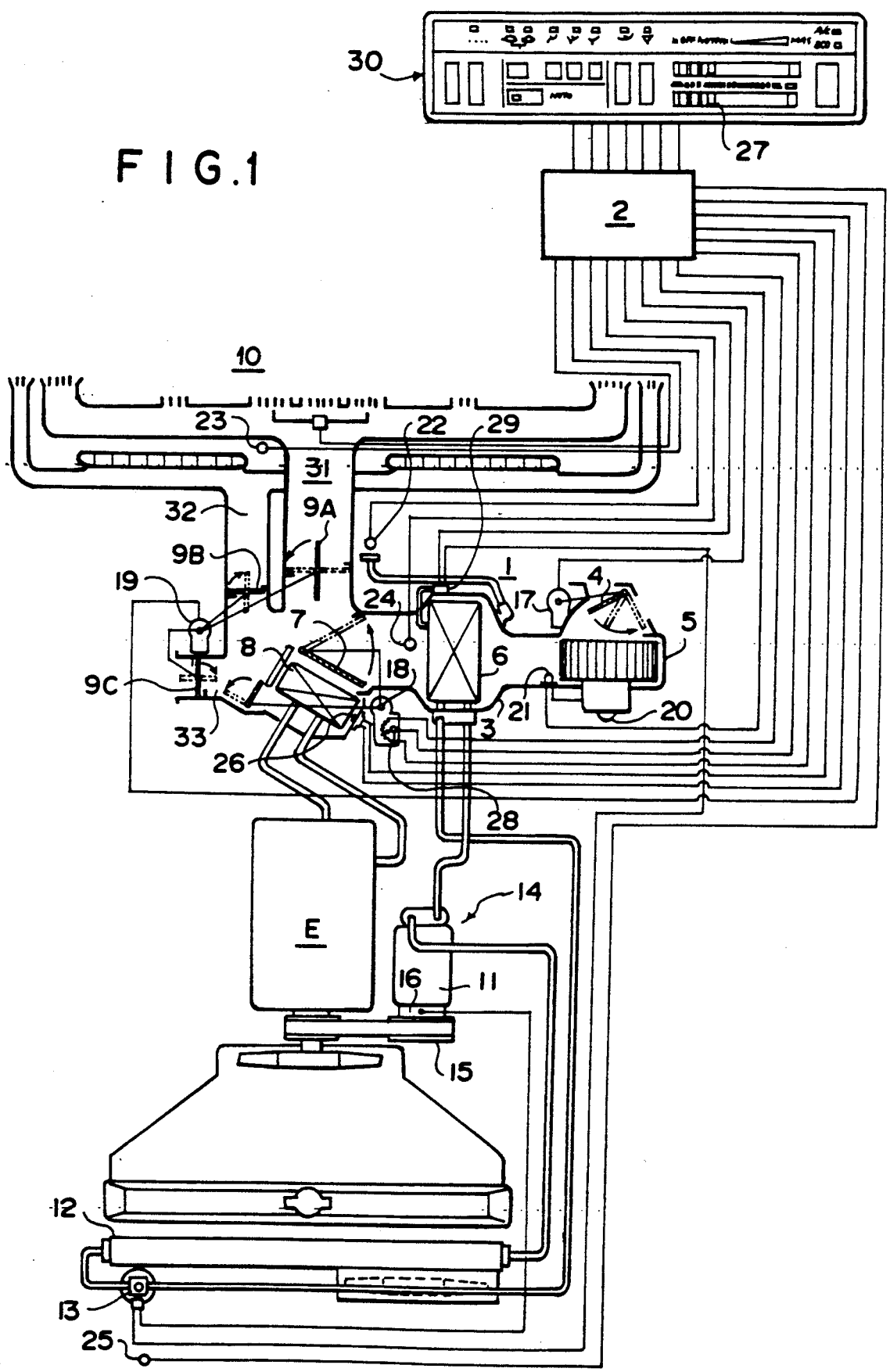
FIG. 1 is a schematic view showing an air conditioner for a vehicle provided with a control system in accordance with an embodiment of the present invention.
Figure 2:
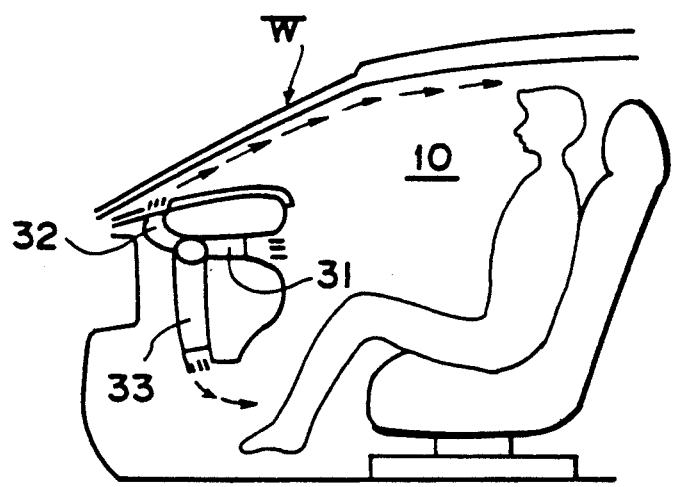
FIG. 2 is a schematic view for illustrating the air flow in the passenger room.

In FIGS. 1 and 2, an air conditioner 1 provided with a control unit 2 in accordance with an embodiment of the present invention has a duct 3 in which the following are provided: an intake door 4 through which the type of air selected by the driver (air from the passenger room or air from the ambience) is taken in, a blower 5 which blows the air taken in through the intake door 4 into the passenger room 10, an air mixing door 7 which controls how much of the total amount of air will branch off into a heater core 8, which total amount of air has passed through an evaporator 6 and has exchanged heat with the air to be blown into the passenger room 10, and three mode switching doors 9A to 9C. The heater core 8 heats the air passing therethrough with heat from the coolant of an engine E which circulates through the heater core 8.

The mode switching door 9A is a vent door which causes the hot air to blow into the passenger room 10 through the central grill and left and right side grills by way of a vent duct 31 while the heater is operating. The mode switching door 9B is a defroster door which causes the hot air to blow against the windshield W through a defroster duct 32. The mode switching door 9c is a heat door which causes the hot air to blow toward the legs of the passenger through a heater duct 33. When the vent mode is selected, only the vent door 9A is open, and when the bi-level mode is selected, the vent door 9A and the heat door 9C are both open. When the heat mode is selected, only the heat door 9c is open. When the heat/defrost mode is selected, the heat door 9C and the defroster door 9B are both open. When the defrost mode is selected, only the defroster door 9B is open.

A cooler 14 comprises a compressor 11, a condenser 12, a receiver 13 and the evaporator 6. The compressor 11 is driven by the output shaft of the engine E by way of a pulley 15 and a magnet clutch 16.

The intake door 4 is driven by a first motor actuator 17, the air mixing door 7 is driven by a second motor actuator 18, and the mode switching doors 9A to 9C are driven by a third motor actuator 19. Reference numeral 20 denotes a blower motor which is driven by a power transistor 21.

Outputs from a room temperature sensor 22 which detects the temperature in the passenger room, a solar radiation sensor 23 which detects the amount of solar radiation, a duct sensor 24 which detects the air temperature at the outlet of the evaporator 6, an ambient temperature sensor 25 which detects the temperature of the ambient air, a coolant temperature sensor 26, a room temperature setter 27 for setting the temperature in the passenger room, a potentiometer 28 which detects the opening of the air mixing door 7, and a thermostat 29 are input into the control unit 2. The control unit 2 controls the driving voltage of the blower motor 20, the timing for the operation of the compressor 11 (which is controlled by way of the magnet clutch 16), and how far the air mixing door 7 is opened on the basis of those outputs and a program stored in a built-in ROM so that the temperature in the passenger room converges on the temperature set by the room temperature setter 27.

FIG. 3 is a flow chart for illustrating the main flow of the control routine which the control unit 2 performs.

In step S1, the control unit 2 (CPU) is reset or initialized. In step S2, it is determined whether the CPU has failed and, then in step S3, it is determined whether the CPU has been in a check mode. When the answers to the questions in steps S2 and S3 are both NO, the outputs of the aforesaid sensors 22 to 26, the room temperature setter 27 and the potentiometer 28 are read and are stored at once in a predetermined area of the RAM. Then a room temperature control signal (which will be referred to as "total signal", hereinbelow) T is calculated on the basis of the following formula (step S4):

$$T=(t_r-25)+\alpha(t_a-25)+\beta(t_d-12)-\gamma(T_D-25)$$

wherein $t_r$, $t_a$, $t_d$ and $T_D$ respectively represent the temperature in the passenger room as detected by the room temperature sensor 22, the ambient temperature as detected by the ambient temperature sensor 25, the air temperature at the outlet of the evaporator 6 as detected by the duct sensor 24 and the set room temperature (the temperature in the passenger room as set by the room temperature setter 27), and $\alpha$, $\beta$ and $\gamma$ are constants. That is, the total signal T is related to the difference between the set room temperature $T_D$ and the actual temperature in the passenger room corrected by the air temperature at the outlet of the evaporator 6 and the ambient temperature. In other words, the total signal T is related to the heat load for converging the actual temperature in the passenger room on the set room temperature $T_D$.

Then the control unit 2 controls how far the air mixing door 7 is opened, and the air blow rate (steps S5 and S6). Further, the control unit 2 controls the temperature at which the compressor 11 is to be driven (step S7). Then the control unit 2 selectively opens and closes the mode switching doors 9A to 9C according to the selected mode and opens or closes the intake door 4 in order to take in air from the passenger room or air from the ambience (steps S8 and S9). Then the control unit 2 returns to step S3. When the answer to the question in step S3 is YES, the control unit 2 locates the fault in step S10.

Figure 4:
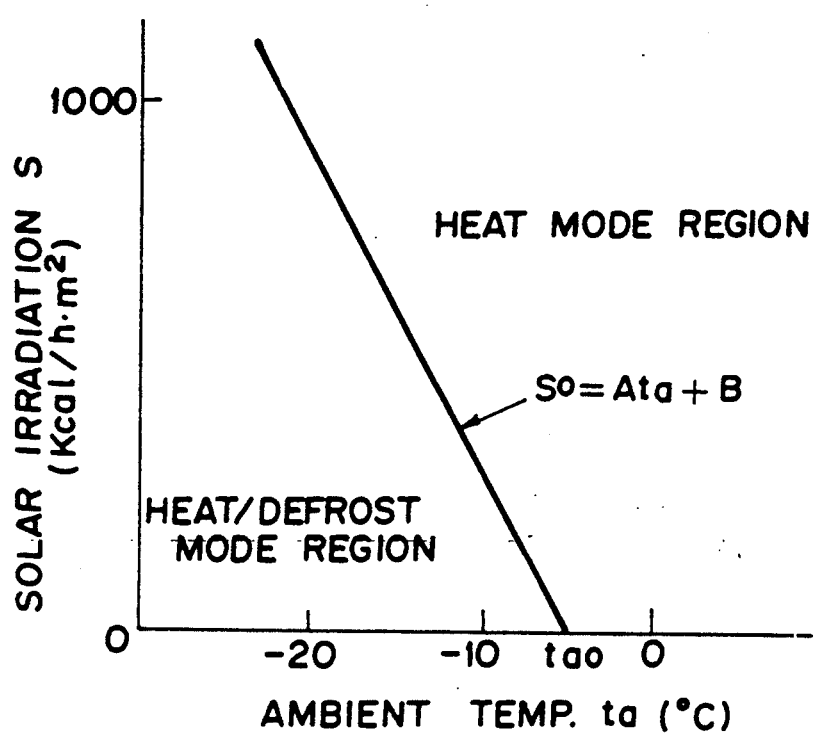
FIG. 4 is a graph showing the mode switching line employed in the embodiment.

In step S8, switching between the heat mode and the heat/defrost mode is effected on the basis of a function in which the amount of solar radiation S depends on the ambient temperature $t_a$. An example of such a function is shown in FIG. 4. In FIG. 4, the single line (which will be referred to as "the mode switching line", hereinbelow) is represented by the formula $S_o = A \cdot t_a + B$ wherein A and B are constants. The mode switching line intersects the $t_a$-axis at a predetermined value $t_{ao}$. When the point associated with the actual ambient temperature and the actual amount of the solar radiation falls in the region below the mode switching line, the control unit 2 switches the mode to the heat/defrost mode, that is, the control unit 2 opens both the heat door 9C and the defroster door 9B. When it falls in the region above the mode switching line, the control unit 2 switches the mode to the heat mode; that is, the control unit 2 opens only the heat door 9C.

FIG. 5 is a flow chart for illustrating the operation of the control unit 2 when it controls the operational mode of the air conditioner 1. In step S11, the control unit 2 determines whether the air conditioner 1 is in the heat mode. When it is determined in step S11 that the air conditioner 1 is not in the heat mode, the control unit 2 causes the air conditioner 1 to remain in the current mode (step S13). Otherwise, the control unit 2 detects the ambient temperature $t_a$ in step S12, and determines whether the ambient temperature $t_a$ is higher than the predetermined value $t_{ao}$ in step S14. When it is determined in step S14 that the ambient temperature $t_a$ is not higher than the predetermined value $t_{ao}$, the control unit 2 detects how much solar radiation S is present in step S15. Then in step S15, the control unit 2 calculates the S-coordinate So of the point on the mode switching line which has a $t_a$-coordinate equal to the ambient temperature $t_a$ detected in step S12. Then the control unit 2 determines in step S17 whether the amount of solar radiation S is larger than the amount indicated by the S-coordinate So. When it is determined that the former is larger than the latter, the control unit 2 causes the air conditioner 1 to remain in the heat mode. Otherwise, the control unit 2 causes the air conditioner 1 to switch the mode to the heat/defrost mode (steps S18 and S19). When it is determined in step S14 that the ambient temperature $t_a$ is higher than the predetermined value $t_{ao}$, the control unit 2 directly proceeds to step S18 and causes the air conditioner 1 to remain in the heat mode.

Though, in this embodiment, the switching between the heat mode and the heat/defrost mode is effected on the basis of a primary correlation between the ambient temperature $t_a$ and the amount of solar radiation S, it also may be effected on the basis of a secondary or higher correlation between the ambient temperature $t_a$ and the amount of solar radiation S.

Figure 6:
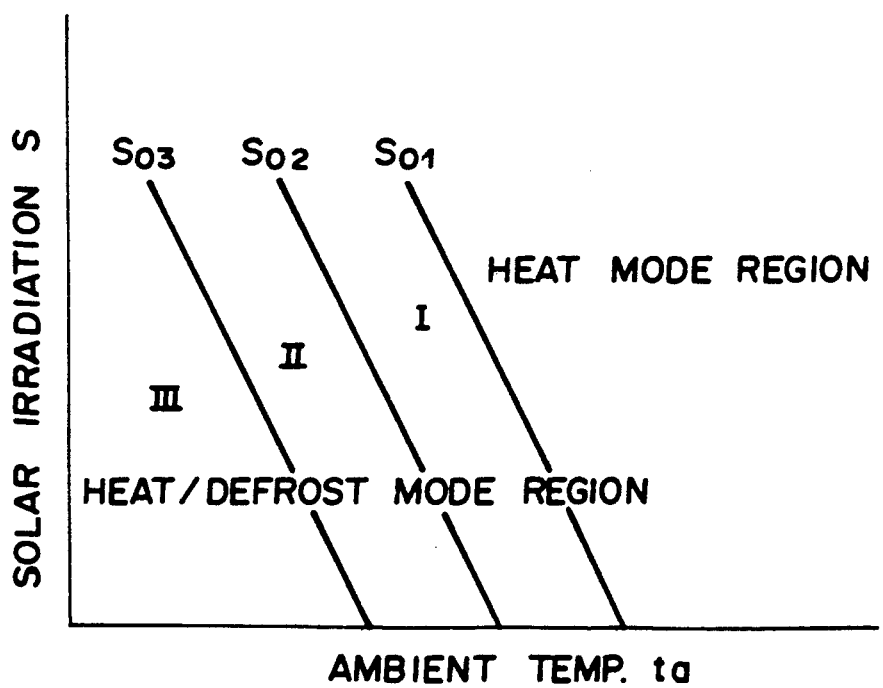
FIG. 6 is a graph similar to that shown in FIG. 4 but for illustrating a modification of the embodiment.

Further, though the switching between the heat mode and the heat-defrost mode is effected on the basis of a single mode switching line in the embodiment described above, the switching between the heat and the heat-defrost mode may be effected on the basis of a plurality of mode switching lines so that the heat/defrost mode is switched in a plurality of stages. For example, as shown in FIG. 6, three switching lines $S_{01}$, $S_{02}$ and $S_{03}$ may be set, and three heat/defrost regions I, II and III may be set so that the amount of air discharged from the defroster vents is minimum in region I and maximum in region III.

We claim:

1. An air conditioner control system for a vehicle which switches the operational mode of the air conditioner at least between a heat mode and a heat/defrost mode according to the conditions inside and outside the passenger room and a desired temperature in the passenger room set by a room temperature setter, characterized in that said air conditioner control system is provided with an ambient temperature sensor, which detects the ambient temperature, and a solar radiation sensor, which detects how much solar radiation is present, and effects the switching between the heat mode and the heat/defrost mode on the basis of the ambient temperature and the amount of solar radiation present.

2. An air conditioner control system as defined in claim 1 in which the operational mode of the air conditioner is switched to the heat/defrost mode at lower and lower ambient temperatures as the amount of solar radiation increases.

3. An air conditioner control system as defined in claim 1 in which the amount of air discharged from the defroster vents when the air conditioner is in the heat/defrost mode increases as the ambient temperature decreases.

* * * * *